United States Patent [19]

Satori

[11] Patent Number: 5,501,433
[45] Date of Patent: Mar. 26, 1996

[54] LIQUID SEALING AND VIBRATION ISOLATOR

[75] Inventor: Kazutoshi Satori, Saitama, Japan

[73] Assignee: Yamashita Rubber Kabushiki Kaisha, Saitama, Japan

[21] Appl. No.: 267,924

[22] Filed: Jul. 6, 1994

[30] Foreign Application Priority Data

Jul. 6, 1993 [JP] Japan ................................ 5-192807
May 10, 1994 [JP] Japan ................................ 6-120500

[51] Int. Cl.$^6$ .................................................... F16F 5/00
[52] U.S. Cl. ...................... 267/140.13; 248/562; 248/636
[58] Field of Search ............................ 267/64.11, 64.13, 267/64.27, 113, 140.11–140.13, 219, 226; 248/562, 636

[56] References Cited

U.S. PATENT DOCUMENTS

| 4,159,091 | 6/1979 | Le Salver et al. | 248/562 |
|---|---|---|---|
| 4,215,842 | 8/1980 | Brenner et al. | 248/562 |
| 4,568,069 | 2/1986 | Poupard | 248/562 X |
| 4,607,828 | 8/1986 | Bodin et al. | 267/140.11 X |
| 4,720,086 | 1/1988 | Le Salver et al. | 267/140.13 |
| 4,762,309 | 8/1988 | Hutchins | 248/636 X |
| 4,765,601 | 8/1988 | Miller et al. | 248/636 X |
| 4,815,720 | 3/1989 | Vanessi | 248/636 X |
| 5,104,100 | 4/1992 | Simuttis | 267/140.13 |
| 5,205,545 | 4/1993 | Quast | 248/562 X |

FOREIGN PATENT DOCUMENTS

| 0042910 | 3/1981 | European Pat. Off. . | |
|---|---|---|---|
| 0156697 | 10/1985 | European Pat. Off. . | |
| 0205657 | 11/1985 | European Pat. Off. . | |
| 0212143 | 6/1986 | European Pat. Off. . | |
| 0231898 | 8/1987 | European Pat. Off. . | |
| 0265681 | 5/1988 | European Pat. Off. . | |
| 0331951 | 9/1989 | European Pat. Off. . | |
| 0527302 | 6/1992 | European Pat. Off. . | |
| 0565860 | 3/1993 | European Pat. Off. . | |
| 3829021 | 3/1989 | Germany . | |
| 4036517 | 5/1992 | Germany . | |
| 62-184254 | 8/1987 | Japan . | |
| 64-1566 | 1/1989 | Japan . | |
| 401229131 | 9/1989 | Japan | 267/140.11 |
| 5-17415 | 3/1993 | Japan . | |
| 2041485 | 9/1980 | United Kingdom . | |
| 8803236 | 5/1988 | WIPO | 248/562 |

OTHER PUBLICATIONS

Patent Abstracts of Japan, vol. 14, No. 364 (M–1007) 7 Aug. 1990, JP–A–02 129 426.
U.S. patent application No. 06/825500 (Marjoram) filed Feb. 3, 1986.

*Primary Examiner*—David M. Mitchell
*Assistant Examiner*—Alfred Muratori
*Attorney, Agent, or Firm*—Birch, Stewart, Kolasch & Birch

[57] ABSTRACT

A vibration isolator includes a substantially sealed space within a housing 4 forming a liquid chamber by partitioning the sealed space with a diaphragm 5. The liquid chamber is further partitioned into first and second chambers 7 and 8 by a rubber partition wall 6. An orifice passage 9 is arranged to communicate between these two chambers 7 and 8. The rubber partition wall 6 is provided at its intermediate portion with a membrane portion 11, a part of which is adapted to serve as a stopper portion 12. When the membrane portion 11 is bent and deformed downwardly, the stopper portion 12 is pushed, at its front end, on a partition wall supporting member 14 for deformation. The repulsion force of the stopper portion 12 by the deformation varies non-linearly in response to the deformation of the membrane portion 11 and as a result, the spring characteristic of the membrane portion 11 also becomes non-linear.

40 Claims, 8 Drawing Sheets

LIQUID SEALING AND VIBRATION ISOLATOR

BACKGROUND OF THE INVENTION

1. Field of the Invention

This invention relates to a liquid sealing and vibration isolating apparatus such as a suspension mounting rubber and an engine mounting rubber of a vehicle and, more particularly, to a liquid sealing and vibration isolating apparatus which can display the non-linear characteristics.

2. Description of the Prior Art

As one example of such a liquid sealing and vibration isolating apparatus, Japanese Patent Unexamined Publication No. 64-1566 discloses a first bracket attached to a body side, a second bracket attached to a side of a vibrating member, a rubber portion provided between the two brackets, a liquid chamber provided in the rubber portion, and a rubber partition wall dividing the liquid chamber into two chambers, wherein the rubber partition wall is integrally formed with an orifice portion communicating with the two liquid chambers and a membrane portion with a thin center portion.

In such a liquid sealing and vibration isolating apparatus, it is desirable to display both low dynamic spring characteristic and high vibration damping characteristic wherein the low dynamic spring characteristic is for effectively absorbing the vibration input of higher frequency with smaller amplitude (hereinafter referred to as small vibration) such as an engine vibration, while the high vibration damping characteristic is for obtaining sufficient damping when the vibration of lower frequency with smaller amplitude such as shake vibration resulting from tire unbalance and the vibration of lower frequency with larger amplitude (hereinafter referred to as large vibration) such as a vibration input from a suspension side in response to the input of irregularities in a road surface.

By the way, it is possible to make the conventional liquid sealing and vibration damping apparatus described above in low dynamic spring condition by decreasing spring constant of the membrane portion, but if the deformation of the membrane portion remains unchanged, it becomes not possible to obtain sufficient high vibration damping since the elastic deformation of the membrane portion also becomes larger accordingly when the large vibration is input. Accordingly, it becomes practically necessary to provide the membrane portion with a deformation control portion for controlling the deformation more than a predetermined stroke.

However, when the membrane portion is provided with such a deformation control portion, it is not only controlled from deforming, but also there is suddenly caused a damping force, thereby making a passenger feel a shock and a vehicle is sometimes uncomfortable to ride in. Also, since there is caused a striking sound whenever the membrane portion contacts with the deformation control portion, it may become a noise source.

Further, a stair-like change of the spring constant in such membrane portion means that the resonance frequency in the orifice portion also changes in such a stair-like manner and as a result, it becomes difficult to maintain the optimum resonance frequency in all area where the damping is needed. Still further, it is necessary in structure to increase the number of parts because of the provision of the deformation control portion.

SUMMARY OF THE INVENTION

It is therefore an object of the present invention to provide an improved liquid sealing and vibration isolating apparatus which can solve the problems described above.

In order to accomplish the above-identified object, there is provided a liquid sealing and vibration isolating apparatus comprising a first connecting member attached to either side of a body or a vibrating member, a second connecting member attached to the other side of the body or the vibrating member, an elastic body provided between the first and second connecting members, a liquid chamber provided between the elastic body and a wall portion formed by either of the first or second connecting members, a partition wall for dividing the liquid chamber into two chambers, and an orifice for communicating between the two liquid chambers divided by the partition wall, wherein the partition wall is provided with a membrane portion allowing the elastic deformation corresponding to the input vibration and with a stopper portion integrally formed with the membrane portion and adapted to abut against an immovable portion when the membrane portion is elastically deformed.

The present invention includes a liquid sealing and vibration isolating apparatus wherein the stopper portion is arranged not to abut against the immovable portion when the vibration is not input.

The present invention includes a liquid sealing and vibration isolating apparatus wherein the stopper portion is always arranged to abut against the immovable portion.

The present invention includes a liquid sealing and vibration isolating apparatus wherein the partition wall is supported by a partition wall supporting member attached to any one of the first and second connecting members or both of them, and the partition wall supporting member is adapted to serve as the immovable portion against which said stopper portion is abutted.

The present invention includes a liquid sealing and vibration isolating apparatus wherein the partition wall consists only of the membrane portion, and an orifice passage is formed within a space enclosed by the partition wall supporting member.

The present invention includes a liquid sealing and vibration isolating apparatus of wherein the membrane portion and the orifice portion are formed independent of each other, and a partition wall is formed by connecting the membrane portion with the orifice portion.

The present invention includes a liquid sealing and vibration isolating apparatus wherein the partition wall is provided with the membrane portion and the orifice portion integrally formed therewith.

The present invention includes a liquid sealing and vibration isolating apparatus wherein the thickness of the membrane portion is designed to be thinner than that of the orifice portion.

The present invention includes a liquid sealing and vibration isolating apparatus wherein the membrane portion is designed to have the same thickness as that of the orifice portion for thickening.

The present invention includes a liquid sealing and vibration isolating apparatus wherein the membrane portion is designed at its center portion to have a thick portion, and a thin portion is provided between the thick portion of the membrane portion and the orifice portion.

The present invention includes a liquid sealing and vibration isolating apparatus of claim 6 or claim 7, wherein a groove is provided between the orifice portion and the membrane portion, and the orifice portion is adapted to come into engagement with the partition wall supporting member of generally U-shaped cross section which is provided with an inner wall to be inserted into the groove.

The present invention includes a liquid sealing and vibration isolating apparatus wherein the stopper portion is adapted to abut against the inner wall of the partition wall supporting member.

The present invention includes a liquid sealing and vibration isolating apparatus wherein the stopper portion is formed at its front end with a plurality of slant surfaces of different angles.

The present invention includes a liquid sealing and vibration isolating apparatus wherein an elastic portion is provided on a counterpart against which the front end of the stopper portion is abutted.

The present invention includes a liquid sealing and vibration isolating apparatus wherein the front end of the stopper portion is adapted to abut against the immovable portion from the direction intersecting the input direction of a major vibration.

The present invention includes a liquid sealing and vibration isolating apparatus wherein the stopper portion varies to increase the contact area thereof abutting against the immovable portion in response to the increase of the elastic deformation amount in the membrane portion.

According to the invention, since the partition wall is provided with the membrane portion, it is possible to keep elasticity by this membrane portion even if the orifice passage is apparently closed by resonance and to absorb the vibration by the elastic deformation corresponding to the vibration to be input.

At this time, since the stopper portion integrally formed with the membrane portion abuts against the immovable portion, it is possible to give the spring characteristic of the membrane portion the non-linear characteristic by the deformation of this stopper portion, thereby controlling the fluid resonance effect. Accordingly, it is possible to consist the damping characteristic control corresponding to the input displacement or the high damping characteristic when large vibration is input with low dynamic spring characteristic when small vibration is input.

According to the invention, when the stopper portion is arranged to abut against the immovable portion from the initial deformation stage of the membrane portion, it is possible to obtain the non-linear characteristic changing smoothly. On the contrary, when the stopper portion is arranged not to abut against the immovable portion in the initial deformation stage of the membrane portion, it is possible to obtain the non-linear characteristic changing in the stair-like manner. As apparent from above, it is possible to obtain various types of non-linear characteristics.

According to the invention, since the immovable portion against which the stopper portion abuts is the partition wall supporting member, it is easy to secure the immovable portion.

According to the invention, since the partition wall consist only of the membrane portion and the orifice portion is formed by making use of the partition wall supporting member, it is possible to make the passage, cross-sectional area of the orifice passage more stable.

According to the invention, since the membrane portion is formed independent of the orifice portion and they are connected with each other by adhesion or the like, it is possible to make the molding of each part smaller and also to combine the materials of different kinds of physical properties together.

According to the invention, since the partition wall is integrally formed with the membrane portion and the orifice portion, it is not only possible for the partition wall to display both the membrane function and the orifice function and the stopper function, but also to make its construction simpler, make the formation of the orifice portion easier and reduce the number of components.

According to the invention, since the membrane portion is formed thin, its elastic deformation becomes easier and the spring constant thereof can be lowered.

According to the invention, the membrane portion is designed to have the same thickness as that of the orifice portion for thickening, it is possible to make the spring constant higher.

According to the invention, since the membrane portion is designed at its center to have a thick portion and a thin portion is provided between the thick portion and the orifice portion, it is not only possible to reinforce the central side of the membrane portion, but also to optionally control the spring constant.

According to the invention, since a groove is formed between the orifice portion and the membrane portion and the inner wall of the partition wall supporting member of generally U-shaped cross section is inserted in to this groove, while the orifice portion engages with the generally U-shaped cross-sectional portion of the partition wall supporting member, it is possible to control the possible change of the passage cross-sectional area corresponding to the deformation of the orifice portion.

According to the invention, since the stopper portion is arranged to abut against the inner wall of the partition wall supporting member, it is possible to make the construction of the components where the stopper portion is received simpler.

According to the invention, since the front end of the stopper portion is provided with a plurality of slant surfaces of different angles, the spring constant varies with the elastic deformation of the membrane portion and it is possible to obtain non-linear spring characteristic changing in a multi-stage manner.

According to the invention, since there is provided an elastic portion on the counterpart against which the front end of the stopper portion is abutted, it is possible to prevent a noise caused when the stopper portion abuts against the counterpart and also to give variety to the deformation of the stopper portion.

According to the invention, since the front end of the stopper portion is arranged to abut against the immovable portion from the direction intersecting the input direction of the major vibration, it is not only possible to form the stopper portion at the periphery of the membrane portion and to facilitate the securement of the immovable portion, but also not to prevent the elastic deformation of the membrane portion at the center where the elastic deformation amount becomes largest.

According to the invention, since the contact area of the stopper portion adapted to abut against the immovable portion, varies to increase in response to the increase of the elastic deformation amount in the membrane portion, it is possible to make the spring constant of the membrane portion non-linear.

BRIEF DESCRIPTION OF THE DRAWINGS

The above and other objects, features and advantages of the invention will become more apparent from the following description taken in conjunction with the accompanying drawings, in which.

DETAILED DESCRIPTION OF THE PREFERRED EMBODIMENTS

Figure 1:
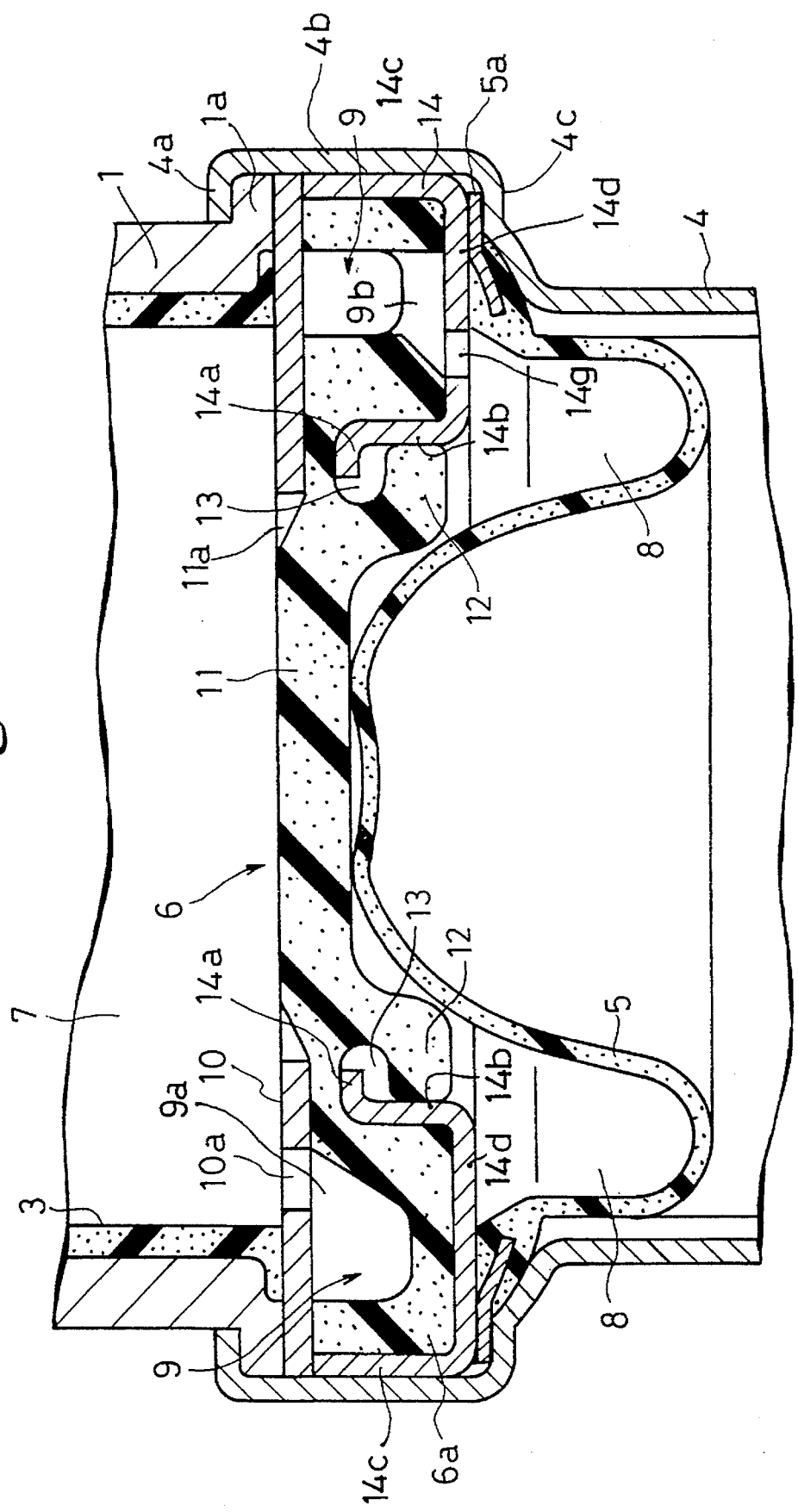
FIG. 1 is an enlarged cross sectional view showing basic parts of a first embodiment of the present invention.
Figure 2:
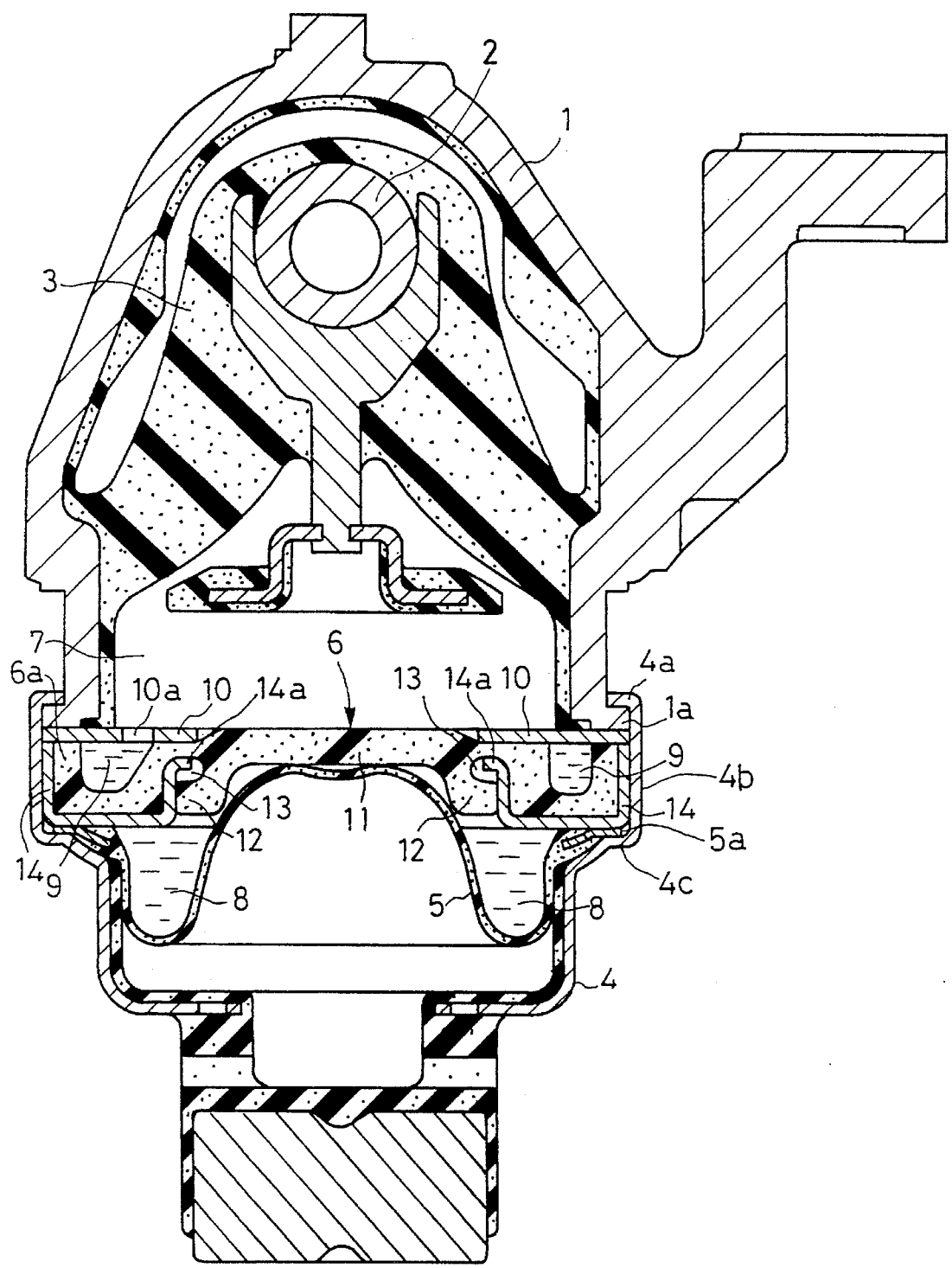
FIG. 2 is an entire cross sectional view showing an engine mount of the first embodiment.

Referring to FIGS. 1 and 2, an engine mount according to an embodiment of the present invention is shown. FIG. 2 is an entire cross sectional view of the engine mount, while FIG. 1 is an enlarged cross sectional view showing basic parts thereof. Referring first to FIG. 2, this engine mount comprises a first connecting member 1 attached to an engine at a vibration side, a second connecting member 2 connected to a body side, and a rubber 3 inserted between the two connecting members. However, it is to be noted that the connecting relation of the two connecting members to the engine or body side may be reversed.

The first connecting member 1 is formed in the shape of a downwardly opened cup, to the opened end portion of which a housing 4 is secured so as to form a substantially closed space inside of the first connecting member 1 and the housing 4. The closed space is partitioned by a diaphragm 5 to form at the side of the rubber 3 a liquid chamber filled with a non-compressible liquid.

This liquid chamber is divided by a rubber partition wall 6 into two chambers: a first chamber 7 provided at the side of the rubber 3; and a second chamber 8 provided below the rubber partition wall 6. Both chambers are communicated by an orifice passage 9 formed on an orifice portion 6a which is the periphery of the rubber partition wall 6. The orifice passage 9 is covered by a ring plate 10. The ring plate 10 is provided with a communicating slot 10a which is adapted to communicate at one end with the first chamber 7, and at the other end with the second chamber 8 described below.

The rubber partition wall 6 comprises the orifice portion 6a provided with the orifice passage 9, a membrane portion 11 provided at its center, and a stopper portion 12 formed thereunder.

As is apparent from FIG. 1, the stopper portion 12 presents a lip-like portion separated at its tip end from the rubber partition wall 6 by a separation groove 13 and in the present embodiment, the front end thereof is arranged to abut against an inner wall 14b of a partition wall supporting member 14 from the initial stage before effecting the elastic deformation of the membrane portion 11.

Also, it is to be noted that the inner wall 14b is an embodiment of the immovable portion against which the front end of the stopper portion 12 abuts and the stopper portion 12 is arranged to strike on the inner wall 14b from the direction intersecting the input direction of a major vibration (the direction parallel to a central axis of the membrane portion 11).

The partition wall supporting member 14 is a ring-shaped member of generally U-shaped cross sectional portion and arranged along the opposite surface (the reverse side) of the rubber partition wall 6 parallel to the ring plate 10. The orifice portion 6a of the rubber partition wall 6 is adapted to engage with the inside of the generally U-shaped space, while the front end 14a of the inner periphery side of the partition wall supporting member 14 is inserted into the separation groove 13, wherein the tip portion of the front end 14a is bent toward the center side parallel to the ring plate 10.

The stopper portion 12 usually abuts against the partition wall supporting member 14. When the membrane portion 11 is bent and deformed in the downward direction of the drawing, the stopper portion 12 is pushed against the partition wall supporting member 14 and deformed so that it can produce a non-linearly increasing repulsive force against the increase of the deformation amount of the membrane portion 11 and as a result, the stopper portion 12 serves to control the deformation extent of the membrane portion 11.

The partition wall supporting member 14 engaged with the rubber partition wall 6 are covered by the ring plate 10. They are mounted on a securing plate 5a formed at the periphery of the diaphragm 5 and then are also mounted on a step portion 4c of a larger diameter portion 4b formed on the opening of the partition wall supporting member 14. An outwardly extending flange 1a formed at the lower end portion of the first connecting member 1 is put on the ring plate 10. Next, the ring plate 10 and the tip end of the outer wall 14c of the partition wall supporting member 14 are mounted on the flange 1a and they are secured all together by caulking the tip end 4a of a housing 4.

At this stage, the ring plate 10 can be pressed down to the side of the rubber partition wall 6 by adjusting the extent of caulking the tip end 4a of a housing 4, wherein formation of interference 11a is adjusted by pressing down the lower side of the ring plate 10, i.e. the side of the orifice portion 6a more than the side of membrane portion 11. However, as shown in another embodiment described below, this interference is not always provided.

Figure 3:
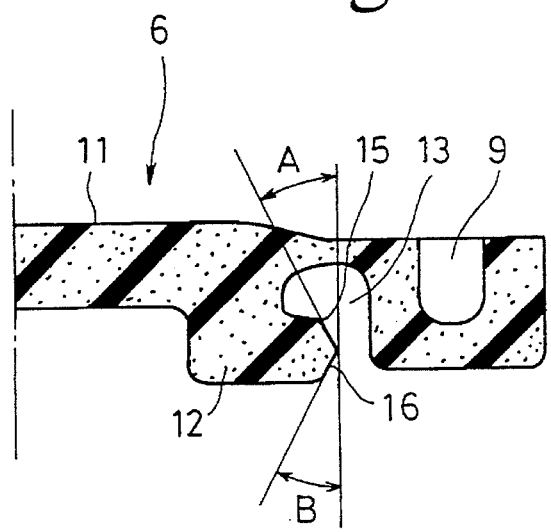
FIG. 3 is an enlarged cross sectional view showing basic parts of a modified version.

FIG. 3 shows a modified version of the stopper portion 12 in which tapered surfaces 15 and 16 are provided at its front end. When the extent of the front end of the stopper portion 12 for striking on the partition wall supporting member 14 is changed by changing each angle (A, B) of the tapered surfaces, it is not only possible to change to increase the contact area of the stopper portion 12 in response to the elastic deformation of the membrane portion 11, but also to obtain various non-linear characteristics because there are many types of change. It is also possible to expect similar change of characteristics even if the thickness of the stopper portion 12 is changed in a multistage manner.

Figure 7:
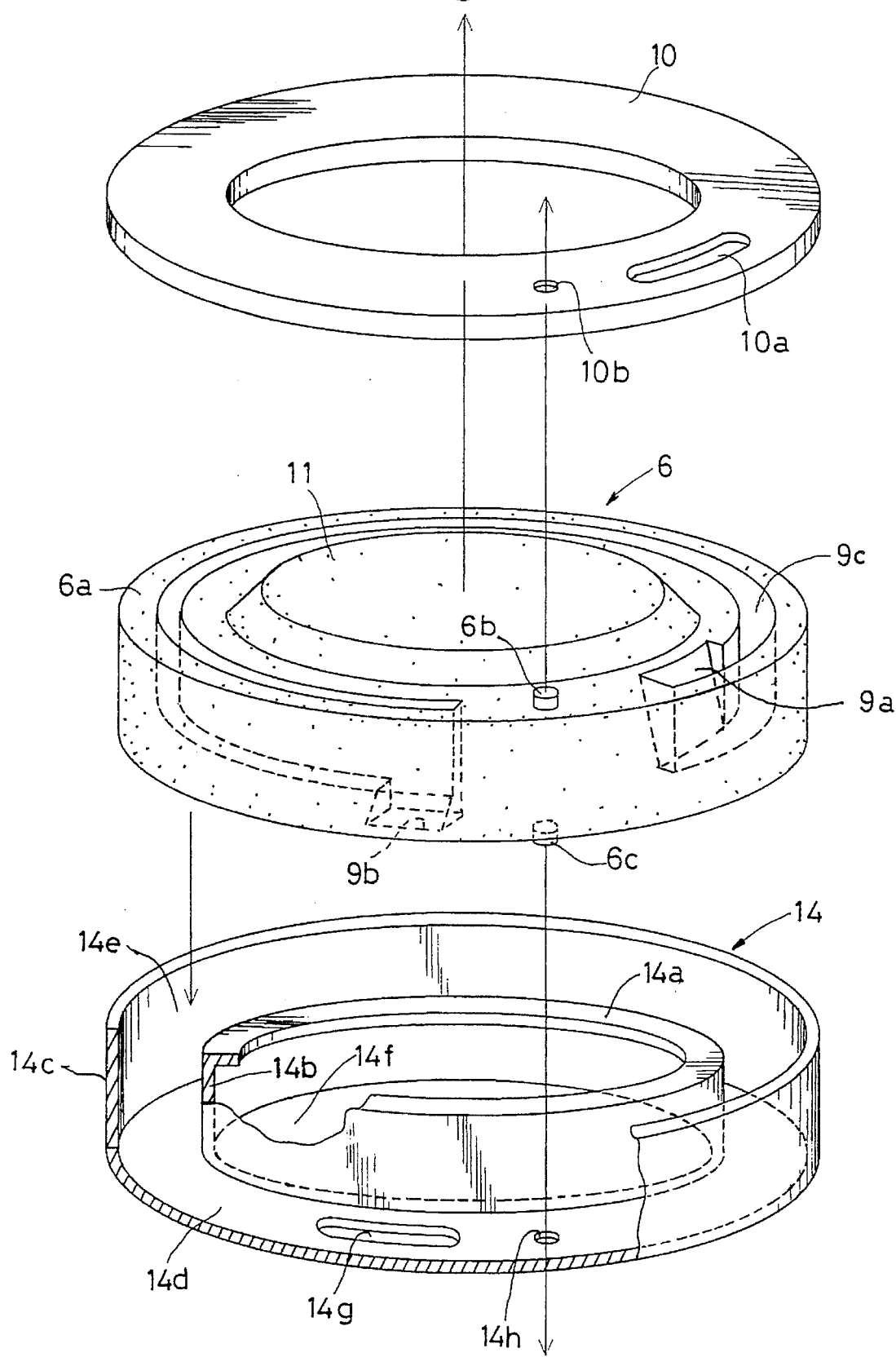
FIG. 7 is an exploded perspective view, partially cut away to show basic parts of the first embodiment.

FIG. 7 is a view showing the construction of the partition wall portion in detail. The ring plate 10 is made of doughnut-shaped metal and provided with an orifice communicating slot 10a and a positioning hole 10b.

This rubber partition wall 6 is provided at its center with the membrane portion 11 which is formed thinner and more yieldable than the orifice portion 6a. On the upper surface of the orifice portion 6a to be covered by the ring plate 10, there is provided an upwardly opened ring groove 9c of generally U-shaped cross section which extends over substantially the whole periphery of the orifice portion 6a.

The orifice passage 9 is formed substantially in a ring-shape by the ring groove 9c and the ring plate 10 adapted to cover this opening (see FIG. 2). A wider portion 9a formed on one end of the ring groove 9c is arranged to be coaxial with the orifice communicating slot 10a of the ring plate 10. The other end of the ring groove 9c is communicated with a through aperture 9b which extends downwardly to be open to the reverse side thereof and is arranged to be coaxial with the orifice communicating slot 14g of the partition wall supporting member 14.

The partition wall supporting member 14 is a cup-shaped member made of metal and provided with a ring groove 14e for receiving the orifice portion 6a therein. The ring groove 14e is formed by a pair of an outer and inner walls 14c and 14b coaxially arranged with a certain space left therebetween, and a bottom portion 14d. The partition wall supporting member 14 is further provided with a central opening 14f which is formed inwardly of the ring groove 14e and which is adapted to receive the membrane portion 11. The bottom portion 14d is formed with said orifice communicating slot 14g and a positioning hole 14h, while the rubber partition wall 6 is formed at its upper and lower surface with positioning projections 6b and 6c, respectively.

Now, when the three members of the ring plate 10, the rubber partition wall 6 and the partition wall supporting member 14 are desired to be incorporated, it is advisable to engage two positioning projections 6b and 6c with two positioning holes 10b and 14h of the ring plate 10 and the partition wall supporting member 14, respectively, so that the wider portion 9a and the communicating slot 10a can be coaxially arranged and at the same time, the through aperture 9b can be coaxially arranged with the orifice communicating slot 14g of the partition wall supporting member 14. Thus, the first and second chambers 7 and 8 are communicated through the orifice passage 9.

Figure 4:
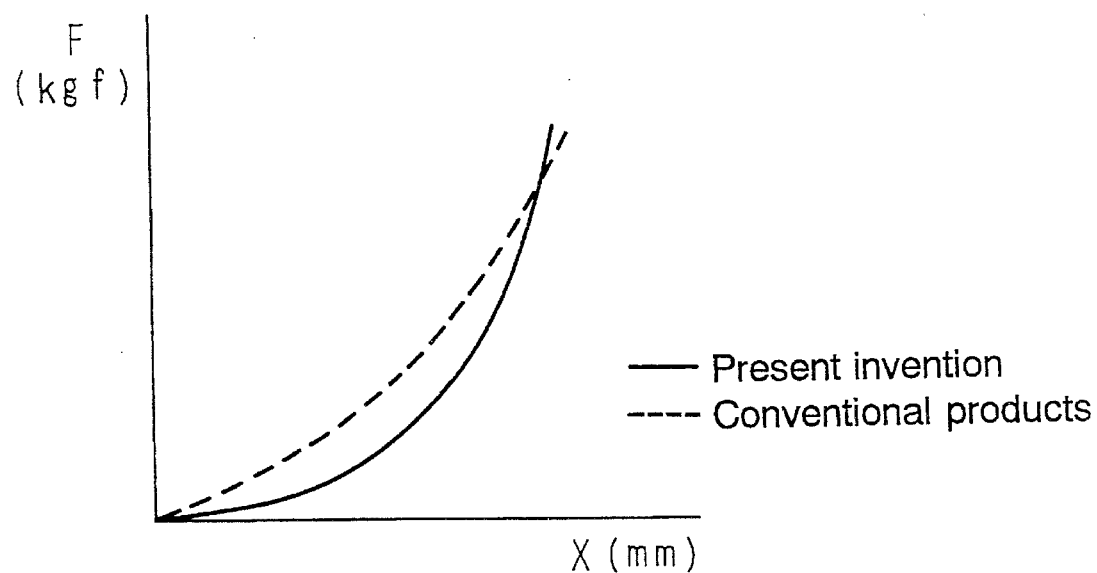
FIG. 4 is a graph showing spring characteristics in a membrane portion of the present invention, wherein the axis of abscissas shows displacement and the axis of ordinates shows a spring force.
Figure 5:
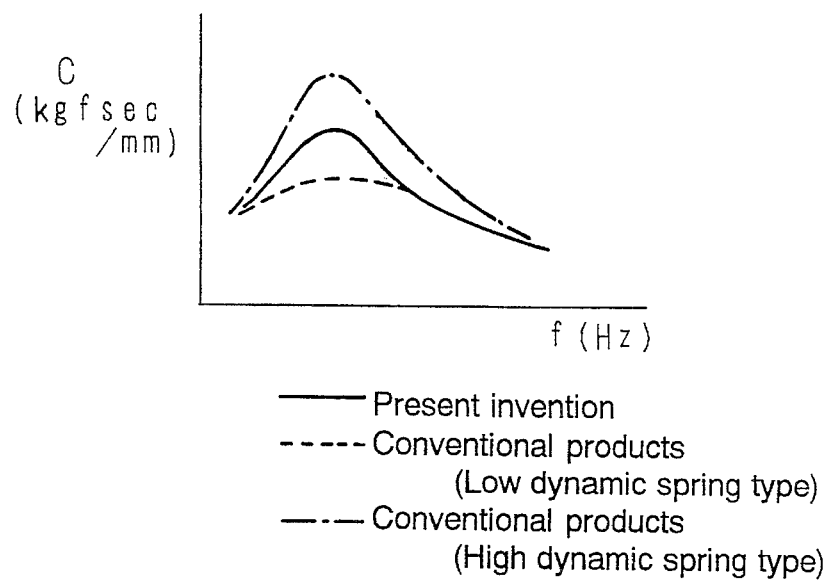
FIG. 5 is a graph showing damping characteristics of the present invention wherein the axis of abscissas shows frequency of input vibration and the axis of ordinates shows damping coefficient.
Figure 6:
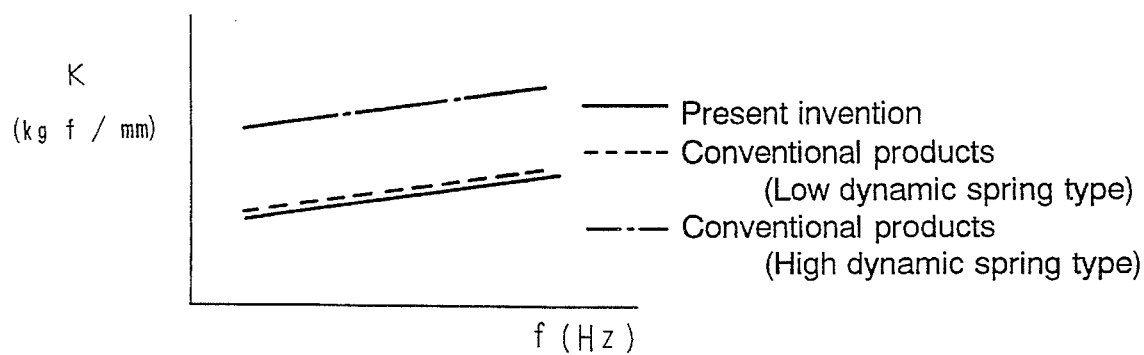
FIG. 6 is a graph showing dynamic spring characteristics of the present invention, wherein the axis of abscissas shows frequency of input vibration and the axis of ordinates shows dynamic spring coefficient.

FIGS. 4 through 6 show spring characteristics of the membrane portion available from the liquid sealing and vibration isolating apparatus of the present invention. As is apparent from the graphs, it is possible to get the spring characteristics which become more non-linear. Also, in the case of an engine mount, the damping characteristic at the displacement area where the engine contraction is needed shows high damping characteristic as shown in FIG. 5, while the dynamic spring characteristic at the displacement area where the vibration isolation of the engine (sound, vibration) is needed shows low dynamic spring characteristic as shown in FIG. 6. It is therefore possible to consist the high damping with the low dynamic spring.

Further, it is possible to make change of the elastic constant of the membrane portion 11 to be smooth and successive curve without stairs by abutting the stopper portion 12 against the inner wall 14b from the initial stage before effecting the elastic deformation in the membrane portion 11.

Still further, since the front end of the stopper portion 12 is arranged to be abutted against the inner wall 14b from the direction intersecting the input direction of the major vibration, it is not only possible to form the stopper portion 12 at the periphery of the membrane portion 11 and facilitate the securement of the immovable portion, but also not to disturb the elastic deformation at the center of the membrane portion where the elastic deformation amount becomes largest.

Also, when a large vibration is input from the suspension, it is possible to improve the endurance of the membrane portion 11 because the stopper portion 12 is arranged to control the displacement of the membrane portion 11. Since the membrane portion 11 is further provided with interference at a joint where the ring plate 10 is mounted, it is possible not to make the membrane portion 11 produce the striking sound.

As shown in FIG. 3, if the spring constant of the membrane portion 11 is combined with a possible tapered top end configuration of the stopper portion 12, it is possible to effect balance tuning between various damping and dynamic spring characteristics.

Figure 8:
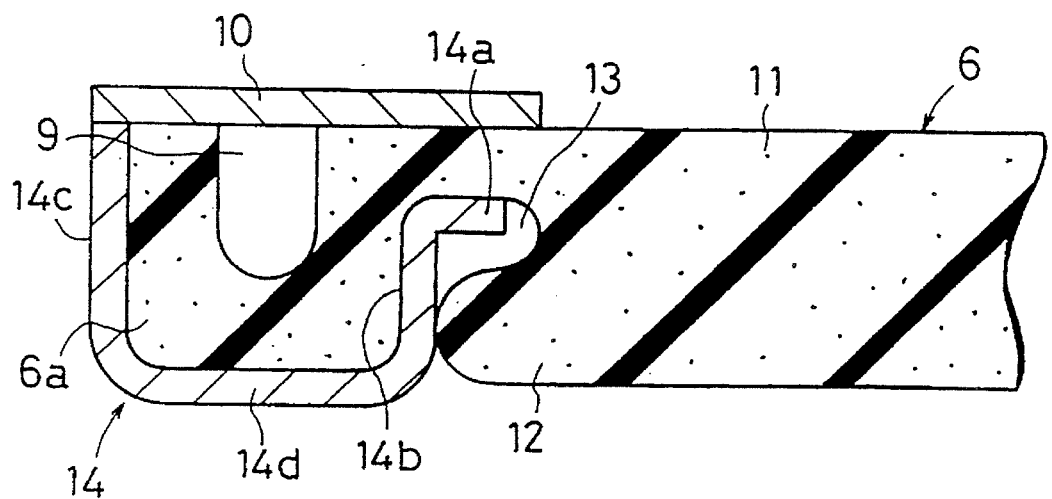
FIG. 8 is a cross sectional view showing basic parts of a second embodiment of the present invention.

FIG. 8 shows basic parts of a second embodiment. This membrane portion 11 differs from the first embodiment in that it has the same thickness as that of the orifice portion 6a and it is not provided on the orifice portion 6a with a stepped portion adapted to serve as the interference when the ring plate 10 is mounted on the orifice portion 6a.

According to the construction of the second embodiment, since the spring constant of the membrane portion 11 can be increased, it becomes possible to control the spring constant by adjusting the thickness. Since the other features of this embodiment are the same as the first embodiment, the same reference numeral is given to the same part or the part with the same function (this also applies to the embodiments described below).

Figure 9:
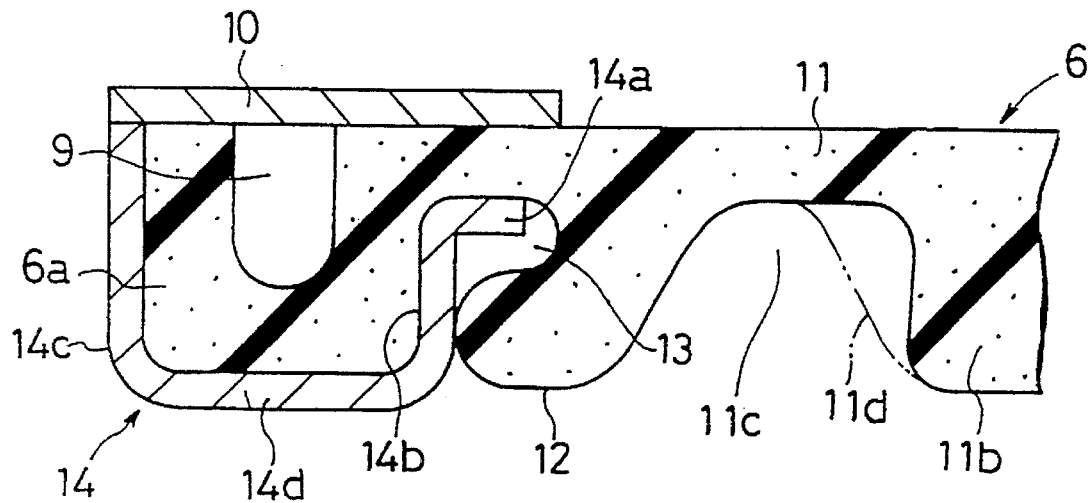
FIG. 9 is a cross sectional view showing basic parts of a third embodiment of the present invention.

FIG. 9 shows a third embodiment in which the membrane portion 11 is designed to have a thick portion 11b only at the center thereof, while there is provided a thin portion 11c of a ring-shape between the thick portion 11b and the stopper portion 12. With this, it is possible to obtain an intermediate spring constant between the first and second embodiments. It is also possible to reinforce the strength of the membrane portion 11.

Further, the shape of the thick portion 11b can be optionally changed as shown by an imaginary line 11d. With this, it is possible to change the spring constant optionally.

Figure 10:
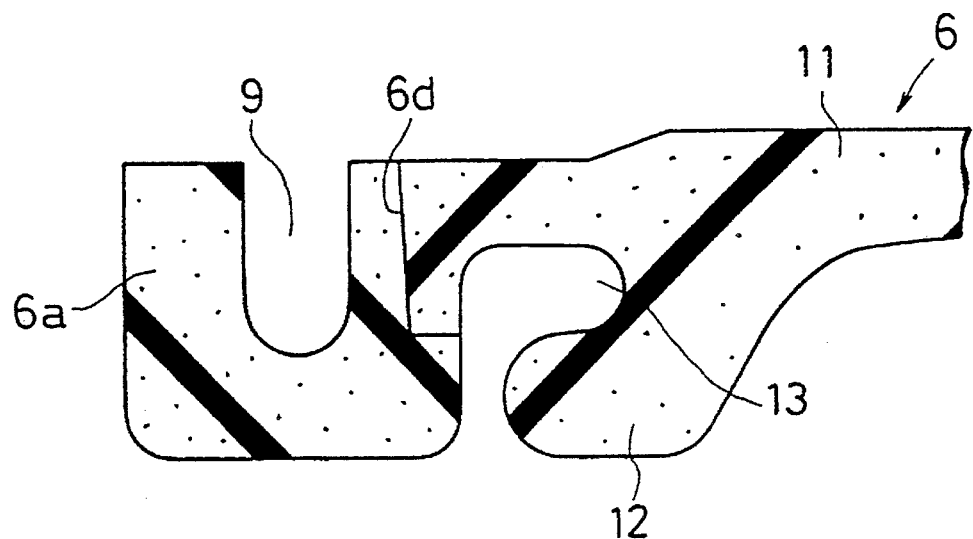
FIG. 10 is a cross sectional view showing basic parts of a fourth embodiment of the present invention.

FIG. 10 shows another embodiment in which the orifice portion 6a is formed independent of the membrane portion 11. The orifice portion 6a and the membrane portion 11 are formed independently of each other and they are connected by adhesives or the like at a joint 6d.

In such a construction, since the orifice portion 6a and the membrane portion 11 can be made smaller, respectively, it is not only possible to make them easier, but also to optionally combine various materials of different properties. For example, if a harder material is used only for the orifice portion 6a, it is possible to prevent the orifice passage 9 from deforming.

Figure 11:
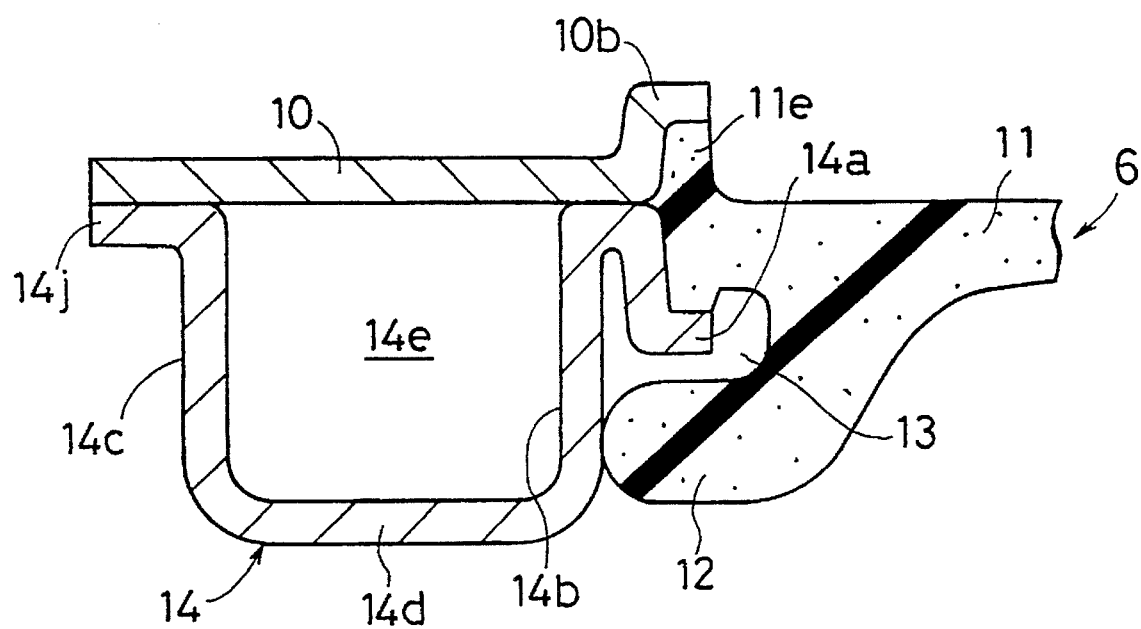
FIG. 11 is a cross sectional view showing basic parts of a fifth embodiment of the present invention.

FIG. 11 shows another embodiment in which the orifice portion side is made of metal, while the rubber partition wall 6 consists only of the membrane portion 11. In this case, the membrane portion 11 is integrally formed at its periphery with a bead-shaped gripping portion 11e which is then clamped by an inner peripheral end 10b of the ring plate 10 and an inner peripheral tip end 14a of the partition wall supporting member 14.

A top end of the outer wall 14c has a horizontally bent outer flange 14j which is arranged to overlap an outer peripheral side of the ring plate 10 and united with it together. With this, a space enclosed by the ring plate 10 and the partition wall supporting member 14 can be utilized as the orifice passage 9. It is also possible to maintain the passage cross sectional area which is not affected by the elastic deformation of the membrane portion 11.

Figure 12:
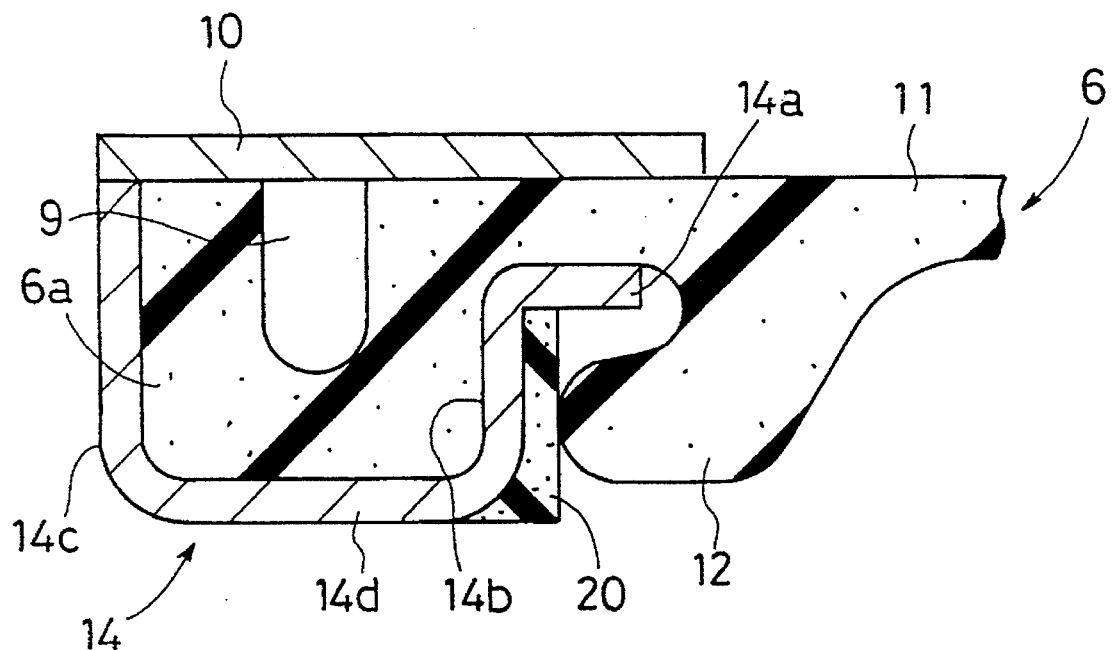
FIG. 12 is a cross sectional view showing basic parts of a sixth embodiment of the present invention.

FIG. 12 shows still another embodiment of the present invention in which there is provided an elastic layer 20 at a side of the inner wall 14b. The elastic layer 20 is a counterpart against which the stopper portion 12 is abutted. With this, it is possible to prevent the stopper portion 12 from producing a striking noise when the top end thereof contacts with the elastic layer 20.

Also, when the conditions of the elastic layer 20 such as the thickness, materials used and elasticity are intentionally changed, it is possible to give variety to the deformation of the stopper portion 12 so as to control the spring constant of the membrane portion 11.

It is also possible to selectively adopt known material for the elastic layer according to the present invention if it is molding material made of rubber or synthetic resin with high elasticity.

It is to be noted that the stopper 12 is not only arranged to abut against the inner wall 14b, but also to abut against the bottom portion 14d (see FIG. 1) of the partition wall supporting member 14 and or the inner wall of the housing 4.

Since the stopper portion 12 can be arranged not to abut against the inner wall 14b in the initial stage before the membrane portion 11 does not start its elastic deformation and then to abut against the same in a predetermined stage of the elastic deformation, it is further possible to make the change of elastic constant to be in a step-like curve having point of inflection.

What is claimed is:

1. A liquid sealing and vibration isolating apparatus comprising:
   a first connecting member attached to at least one of a body and a vibrating member;
   a second connecting member attached to at least one of the other of the body and the vibrating member;
   an elastic body provided between the first and second connecting members;
   a liquid chamber provided between the elastic body and a wall portion formed by either of the first and second connecting member;
   a partition wall for dividing the liquid chamber into two chambers; and
   an orifice for communicating between the two liquid chambers divided by the partition wall;
   wherein the partition wall is provided with a membrane portion allowing elastic deformation corresponding to an input vibration and with a stopper portion integrally formed with the membrane portion and adapted to abut against an immovable portion when the membrane portion is elastically deformed, said stopper portion being formed at a periphery of the membrane portion and projecting continuously in a circumferential direction thereof and further including an immovable portion positioned adjacent to said stopper portion and being disposed to be substantially perpendicular to the projecting direction of said stopper portion.

2. The liquid sealing and vibration isolating apparatus as claimed in claim 1, wherein the stopper portion is arranged not to abut against the immovable portion in an initial condition of the membrane portion when the vibration is not input.

3. The liquid sealing and vibration isolating apparatus as claimed in claim 1, wherein the stopper portion is always arranged to abut against the immovable portion during an initial condition of the membrane portion.

4. The liquid sealing and vibration isolating apparatus as claimed in claim 1, wherein the partition wall is supported by a partition wall supporting member attached to one of the first and second connecting members or both of them, and the partition wall supporting member is adapted to serve as the immovable portion against which said stopper portion is abutted.

5. The liquid sealing and vibration isolating apparatus as claimed in claim 4, wherein the partition wall consists only of the membrane portion, and an orifice passage is formed within a space enclosed by the partition wall supporting member.

6. The liquid sealing and vibration isolating apparatus as claimed in claim 1, wherein the membrane portion and an orifice portion are formed independent of each other, and the partition wall is formed by connecting the membrane portion with the orifice portion.

7. The liquid sealing and vibration isolating apparatus as claimed in claim 6, wherein a thickness of the membrane portion is designed to be thinner than that of the orifice portion.

8. The liquid sealing and vibration isolating apparatus as claimed in claim 6, wherein the membrane portion is designed to have the same thickness as that of the orifice portion.

9. The liquid sealing and vibration isolating apparatus as claimed in claim 6, wherein the membrane is designed at its center portion to have a thick portion, and a thin portion is provided between the thick portion of the membrane portion and the orifice portion.

10. The liquid sealing and vibration isolating apparatus as claimed in claim 6, wherein a groove is provided between the orifice portion and the membrane portion, and the orifice portion is adapted to come into engagement with the partition wall supporting member of generally U-shaped cross section which is provided with an inner wall to be inserted into the groove.

11. The liquid sealing and vibration isolating apparatus as claimed in claim 10, wherein the stopper portion is adapted to abut against the inner wall of the partition wall supporting member.

12. The liquid sealing and vibration isolating apparatus as claimed in claim 1, wherein the partition wall is provided with a membrane portion and an orifice portion integrally formed therewith.

13. The liquid sealing and vibration isolating apparatus as claimed in claim 1, wherein the stopper portion is formed at a front end with a plurality of slant surfaces of different angles.

14. The liquid sealing and vibration isolating apparatus as claimed in claim 1, wherein an elastic portion is provided on a counterpart against which a front end of the stopper portion is abutted.

15. The liquid sealing and vibration isolating apparatus as claimed in claim 1, wherein the front end of the stopper portion is adapted to abut against the immovable portion from a direction intersecting an input direction of a major vibration.

16. The liquid sealing and vibration isolating apparatus as claimed in claim 1, wherein the stopper portion varies to increase the contact area thereof abutting against the immovable portion in response to an increase of the elastic deformation amount in the membrane portion.

17. A liquid sealing and vibration isolating apparatus comprising:

a first connecting member attached to at least one of a body and a vibrating member;

a second connecting member attached to the other of the body and the vibrating member;

an elastic body provided between the first and second connecting members;

a liquid chamber provided between the elastic body and a wall portion formed by either of the first and second connecting member;

a partition wall for dividing the liquid chamber into two chambers; and an orifice for communicating between the two liquid chambers divided by the partition wall;

wherein the partition wall is provided with a membrane portion allowing elastic deformation corresponding to an input vibration and with a stopper portion integrally formed with the membrane portion and adapted to abut against an immovable portion when the membrane portion is elastically deformed, said membrane portion and said orifice portion being formed independent of each other, and a partition wall being formed by connecting the membrane portion with the orifice and further including a groove positioned between the orifice portion and the membrane portion, and the orifice portion is adapted to come into engagement with a partition wall supporting member of generally U-shaped cross section which is provided with an inner wall to be inserted into the groove.

18. The liquid sealing and vibration isolating apparatus according to claim 17, wherein the stopper portion is arranged not to abut against the immovable portion in an initial condition of the membrane portion when the vibration is not input.

19. The liquid sealing and vibration isolating apparatus according to claim 17, wherein the stopper portion is always arranged to abut against the immovable portion during an initial condition of the membrane portion.

20. The liquid sealing and vibration isolating apparatus according to claim 17, wherein the partition wall is supported by the partition wall supporting member attached to one of the first and second connecting members or both of them, and the partition wall supporting member is adapted to serve as the immovable portion against which said stopper portion is abutted.

21. The liquid sealing and vibration isolating apparatus according to claim 17, wherein a thickness of the membrane portion is designed to be thinner than that of the orifice portion.

22. The liquid sealing and vibration isolating apparatus according to claim 17, wherein the membrane portion is designed to have the same thickness as that of the orifice portion.

23. The liquid sealing and vibration isolating apparatus according to claim 17, wherein the membrane portion is designed at its center to have a thick portion, and a thin portion is provided between the thick portion of the membrane portion and the orifice portion.

24. The liquid sealing and vibration isolating apparatus according to claim 17, wherein the stopper portion is adapted to abut against the inner wall of the partition wall supporting member.

25. The liquid sealing and vibration isolating apparatus according to claim 17, wherein the stopper portion is formed at a front end with a plurality of slant surfaces of different angles.

26. The liquid sealing and vibration isolating apparatus according to claim 17, wherein an elastic portion is provided on a counterpart against which a front end of the stopper portion is abutted.

27. The liquid sealing and vibration isolating apparatus according to claim 17, wherein a front end of the stopper portion is adapted to abut against the immovable portion from a direction intersecting an input direction of a major vibration.

28. The liquid sealing and vibration isolating apparatus according to claim 17, wherein the stopper portion varies to increase the contact area thereof abutting against the immovable portion in response to an increase of the elastic deformation amount in the membrane portion.

29. A liquid sealing and vibration isolating apparatus comprising:

a first connecting member attached to at least one of a body and a vibrating member;

a second connecting member attached to the other of the body and the vibrating member;

an elastic body provided between the first and second connecting members;

a liquid chamber provided between the elastic body and a wall portion formed by either of the first and second connecting member;

a partition wall for dividing the liquid chamber into two chambers; and an orifice for communicating between the two liquid chambers divided by the partition wall;

wherein the partition wall is provided with a membrane portion allowing elastic deformation corresponding to an input vibration and with a stopper portion integrally formed with the membrane portion and adapted to abut against an immovable portion when the membrane portion is elastically deformed, said partition wall is provided with a membrane portion and an orifice portion integrally formed therewith, and further including a groove positioned between the orifice portion and the membrane portion, and the orifice portion is adapted to come into engagement with a partition wall supporting member of generally U-shaped cross section which is provided with an inner wall to be inserted into the groove.

30. The liquid sealing and vibration isolating apparatus according to claim 29, wherein the stopper portion is arranged not to abut against the immovable portion of an initial condition of the membrane portion when the vibration is not input.

31. A liquid sealing and vibration isolating apparatus according to claim 29, wherein the stopper portion is always arranged to abut against the immovable portion during an initial condition of the membrane portion.

32. The liquid sealing and vibration isolating apparatus according to claim 29, wherein the partition wall is supported by the partition wall supporting member attached to one of the first and second connecting members or both of them, and the partition wall supporting member is adapted to serve as the immovable portion against which said stopper portion is abutted.

33. The liquid sealing and vibration isolating apparatus according to claim 29, wherein a thickness of the membrane portion is designed to be thinner than that of the orifice portion.

34. The liquid sealing and vibration isolating apparatus according to claim 29, wherein the membrane portion is designed to have the same thickness as that of the orifice portion.

35. The liquid sealing and vibration isolating apparatus according to claim 29, wherein the membrane portion is designed at its center to have a thick portion, and a thin portion is provided between the thick portion of the membrane portion and the orifice portion.

36. The liquid sealing and vibration isolating apparatus according to claim 29, wherein the stopper portion is adapted to abut against the inner wall of the partition wall supporting member.

37. The liquid sealing and vibration isolating apparatus according to claim 29, wherein the stopper portion is formed at a front end with a plurality of slant surfaces of different angles.

38. The liquid sealing and vibration isolating apparatus according to claim 29, wherein an elastic portion is provided on a counterpart against which a front end of the stopper portion is abutted.

39. The liquid sealing and vibration isolating apparatus according to claim 29, wherein a front end of the stopper portion is adapted to abut against the immovable portion from a direction intersecting an input direction of a major vibration.

40. The liquid sealing and vibration isolating apparatus according to claim 29, wherein the stopper portion varies to increase the contact area thereof abutting against the immovable portion in response to an increase of the elastic deformation amount in the membrane portion.

* * * * *